Figure 4:
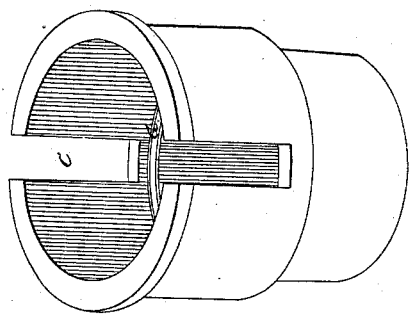

J. Williston,
Hose Coupling,
Nº 37,021. Patented Nov. 25, 1862.

UNITED STATES PATENT OFFICE.

JOHN WILLISTON, OF VALLEJO, CALIFORNIA.

IMPROVEMENT IN HOSE-COUPLINGS.

Specification forming part of Letters Patent No. 37,021, dated November 25, 1862.

*To all whom it may concern:*

Be it known that I, the undersigned, JOHN WILLISTON, of Vallejo, in the county of Solano, in the State of California, have invented a new and useful Improvement in Hose and Pipe Couplings, of which the following is a full and exact description.

The improved hose and pipe coupling consists of two sections or parts, both cylindrical in form, which may be called the "male" and "female" sections, and may be made of brass or other suitable material and of any required magnitude.

The male section is provided with two ribs or projections on the opposite sides of it, (similar to a feather on a shaft,) the extremities of which ribs are increased in thickness for a short distance from the ends, to form catches or lugs, which, with the aid of the set or tightening ring, hereinafter mentioned, connect and hold together the sections when in use.

The female section is provided with slots or openings on the opposite sides of it, corresponding in position, of like dimensions, and for the purpose of receiving the ribs of the male section.

The set or tightening ring is provided with two grooves or channels, made in its inside surface, for the passage of the lugs of the male section. This ring surrounds the female section, about which it moves freely, and may be attached to it by a flange, as represented in the drawings, or by a screw cut upon the outside of the female section and the inside of the ring. One edge of the ring works against the flange, when a flange is used, and is parallel with it. The two parts lying between the grooves which constitute the other edge of the ring form each an inclined plane.

In order to unite or couple the sections, the male section is to be inserted in the female section, the ribs in the slots, and the lugs passing through the grooves in the tightening-ring. The ring is then to be turned on its axis, when the inclined portions of the edge of the ring will come in contact with the lugs on the male section and press it forward to a joint on the inside of the female section.

In case the joint should not prove to be perfectly tight it can be made so by the interposition of a washer, of gum or other material, and to retain the washer in its place it may be inserted in a groove prepared for the purpose in the female section.

Figure 5:
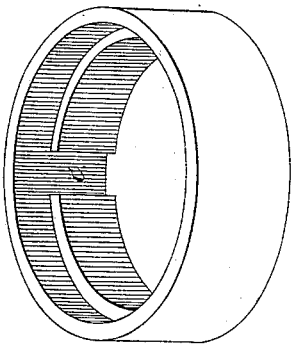
Figure 1:
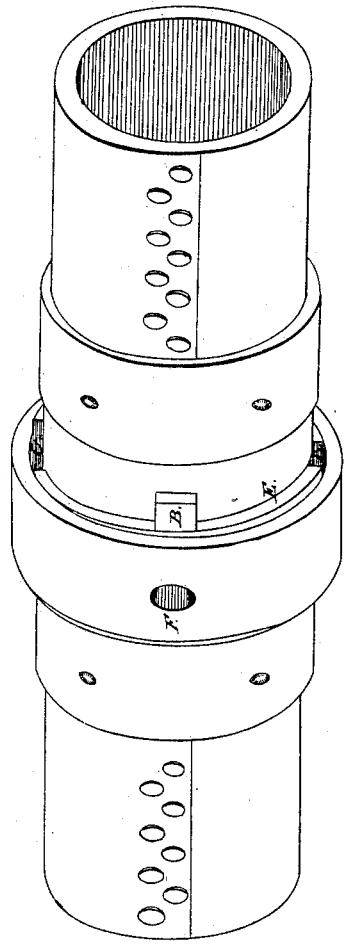
Figure 3:
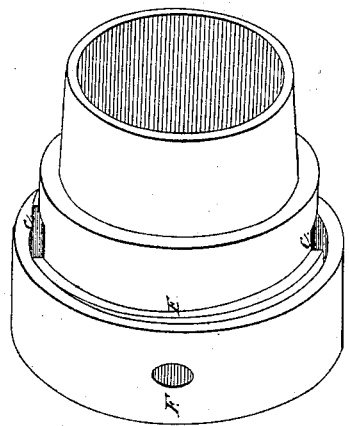
Figure 2:
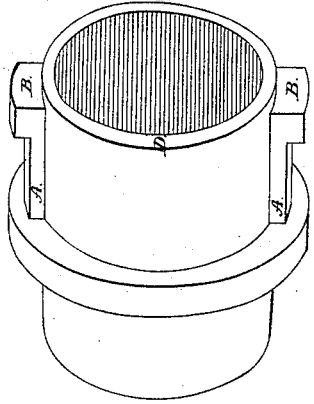

Referring to the drawings, Figure 1 is the coupling connected and ready for use; Fig. 2, the male section; Fig. 3, the female section with the set or tightening ring attached; Fig. 4, the female section separate; Fig. 5, the set or tightening ring.

Letter A represents the ribs on the male section; letter B, the lugs or catches; letter C, the slots in the female section and grooves in the tightening-ring, for the reception and passage, respectively, of the ribs and lugs; letter D, the end of the male section which forms the joint; letter E, the edge of the tightening-ring, the parts of which form inclined planes; letter F, spanner-holes; letter G, groove for washer.

What I claim, and desire to secure by Letters Patent, is—

The ribs A and lugs B, Fig. 2, the slots C C, Fig. 4, and the set or tightening ring, Fig. 5, the whole constructed and operating substantially as herein described and set forth.

In testimony whereof I, the said JOHN WILLISTON, hereto subscribe my name, in the presence of the witnesses whose names are hereto subscribed, on the 20th day of November, A. D. 1861.

JNO. WILLISTON.

In presence of—
 J. H. BRUDEN,
 JOHN E. WILLISTON.